(12) United States Patent
Hamrock et al.

(10) Patent No.: US 6,649,295 B2
(45) Date of Patent: Nov. 18, 2003

(54) MEMBRANE ELECTRODE ASSEMBLY HAVING ANNEALED POLYMER ELECTROLYTE MEMBRANE

(75) Inventors: Steven Joseph Hamrock, Stillwater, MN (US); John Leonard Lewin, Farmington, MN (US); Shane Shanhong Mao, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 248 days.

(21) Appl. No.: 09/837,771

(22) Filed: Apr. 18, 2001

(65) Prior Publication Data

US 2001/0031388 A1 Oct. 18, 2001

Related U.S. Application Data

(60) Provisional application No. 60/197,741, filed on Apr. 18, 2000.

(51) Int. Cl.[7] .............. H01M 8/10; H01M 6/00
(52) U.S. Cl. .............. 429/30; 429/33; 429/40; 429/42; 29/623.1; 29/623.3; 427/115
(58) Field of Search .............. 429/30, 33, 40, 429/42; 29/623.1, 623.3; 427/115

(56) References Cited

U.S. PATENT DOCUMENTS 5,761,793 A    6/1998   Bevers et al.

FOREIGN PATENT DOCUMENTS

| JP | 11 204119 | 7/1999 | |
| JP | 11-204119 | * 7/1999 | ............ H01M/8/02 |
| WO | WO 98/51733 | 11/1998 | |

* cited by examiner

*Primary Examiner*—Patrick Ryan
*Assistant Examiner*—Angela J. Martin
(74) *Attorney, Agent, or Firm*—Philip Y. Dahl

(57) ABSTRACT

A membrane electrode assembly (MEA) is provided which comprises an annealed polymer electrolyte membrane (PEM). Additionally, the MEA may include annealed catalyst layers annealed in contact with the annealed PEM. Additionally, methods of manufacture are provided. MEA's according to the present invention may be used in an electrochemical cell, such as a hydrogen fuel cell.

15 Claims, No Drawings

MEMBRANE ELECTRODE ASSEMBLY HAVING ANNEALED POLYMER ELECTROLYTE MEMBRANE

CROSS REFERENCE TO RELATED APPLICATION

This application claims priority to U.S. Provisional Patent Application No. 60/197,741, filed Apr. 18, 2000.

FIELD OF THE INVENTION

This invention relates to a membrane electrode assembly (MEA) for use in an electrochemical cell, such as a hydrogen fuel cell, which comprises an annealed polymer electrolyte membrane (PEM) and may additionally comprise an annealed catalyst layer.

SUMMARY OF THE INVENTION

Briefly, the present invention provides a membrane electrode assembly (MEA) comprising an annealed polymer electrolyte membrane (PEM). The polymer electrolyte is cast, coated or otherwise formed from a suspension and subsequently annealed to a temperature of 120° C. or greater or more preferably 130° C. or greater.

In another aspect, the present invention provides an MEA having one or more annealed catalyst layers, which are annealed to a surface of the annealed PEM.

It is an advantage of the present invention to provide an MEA having superior performance in a hydrogen fuel cell, including superior mechanical strength and durability.

DETAILED DESCRIPTION OF PREFERRED EMBODIMENTS

The present invention provides a membrane electrode assembly (MEA) comprising an annealed polymer electrolyte membrane (PEM) and optionally one or more annealed catalyst layers.

The polymer electrolytes useful in the present invention are preferably acid-functional fluoropolymers or salts thereof, such as Nafion® (DuPont Chemicals, Wilmington Del.) and Flemion™ (Asahi Glass Co. Ltd., Tokyo, Japan). The polymer electrolytes useful in the present invention are preferably copolymers of tetrafluoroethylene and one or more fluorinated, acid-functional comonomers. Preferably the polymer electrolyte bears sulfonate functional groups. Most preferably the polymer electrolyte is Nafion. The polymer electrolyte preferably has an acid equivalent weight of 1200 or less, more preferably 1100 or less, more preferably 1050 or less, and most preferably about 1000. The polymer electrolyte is preferably obtained as an aqueous dispersion. The dispersion may also include organic solvents including alcohols. More preferably the dispersion includes a mixture of water and alcohols. Such dispersions are sometimes referred to as solutions. Preferably the dispersion excludes solvents having a boiling point above 100° C., i.e., greater than that of water.

The polymer electrolyte is first cast, coated or otherwise formed from a suspension into a suitable shape, preferably a thin layer, and subsequently annealed. Any suitable method of coating or casting may be used, including bar coating, spray coating, slit coating, brush coating, and the like.

The annealing temperature is preferably greater than 120° C. and more preferably 130° C. or more. The time of annealing is preferably sufficient to allow the surface of the polymer electrolyte to reach a suitable annealing temperature and more preferably sufficient to allow the entire mass of the polymer electrolyte to reach a suitable annealing temperature. In thin layers, times of less than a minute may be sufficient. In the annealed material, polymer particles which are distinct in the dispersion and which remain distinct in the cast or coated membrane coalesce to form a continuous solid phase with reduced or preferably obliterated boundaries.

A polymer electrolyte membrane (PEM) according to the present invention preferably has a thickness of less than 50 $\mu$m, more preferably less than 40 $\mu$m, more preferably less than 30 $\mu$m, and most preferably about 25 $\mu$m. Preferably the PEM contains no supporting structural material or matrix in addition to the polymer electrolyte, and more preferably the PEM is composed only of annealed polymer electrolyte.

The PEM according to the present invention may be sandwiched between two catalyst coated gas diffusion layers (CCGDL's) to form a membrane electrode assembly (MEA). The CCGDL may be formed by coating a gas diffusion layer (GDL) with a catalyst ink. The catalyst ink preferably comprises additional polymer electrolyte material which is annealed during bonding to the previously annealed PEM. The annealing temperature is preferably greater than 120° C. and more preferably 130° C. or more.

In one preferred method, a catalyst dispersion or ink is first made by dispersing carbon-supported catalyst particles in a dispersion of a polymer electrolyte. The carbon-supported catalyst particles are preferably 50–60% carbon and 40–50% catalyst metal by weight, the catalyst metal preferably comprising Pt for the cathode and Pt and Ru in a weight ratio of 2:1 for the anode. The electrolyte dispersion is preferably an aqueous dispersion, preferably of a solid polymer electrolyte such as Nafion™ (DuPont Chemicals, Wilmington Del.). The polymer electrolyte preferably has an equivalent weight of 1200 or less, more preferably 1100 or less, more preferably 1050 or less, and most preferably about 1000. The mixture is preferably heated with high shear stirring for 30 minutes and diluted to a coatable consistency.

The gas diffusion layer is electrically conductive and permeable to fluids and preferably comprises carbon, such as carbon fibers. The gas diffusion layer is preferably Toray Carbon Paper (Toray Industries, Inc., Tokyo, Japan). Prior to coating with the catalyst dispersion, the gas diffusion layer has preferably been coated with a hydrophobic layer such as Teflon™, preferably by dipping in an aqueous suspension thereof, and then has preferably been coated with a carbon black dispersion. The carbon black dispersion is preferably an aqueous dispersion comprising carbon black and Teflon and optionally a surfactant such as TRITON X-100 (Union Carbide Corp., Danbury, Conn.). More preferably, the dispersant is a combination of water and isopropyl alcohol, preferably comprising more than 60% by weight isopropyl alcohol. The carbon black dispersion is preferably coated onto the dried Toray paper at a wet thickness of 0.01 to 0.1 mm. The Teflon and carbon black coated GDL is preferably dried in an oven at 380° C. for 10 minutes. This coated GDL is then further coated with the catalyst dispersion prepared above, preferably in an amount yielding 0.2–5 mg of catalyst metal (Pt or Pt plus Ru) per square centimeter, preferably about 0.5 mg of catalyst metal (Pt or Pt plus Ru) per square centimeter, to form a catalyst-coated gas diffusion layer (CCGDL).

The PEM according to the present invention is sandwiched between two catalyst coated gas diffusion layers (CCGDL's), with the catalyst coating facing the PEM.

Preferably, the MEA is pressed, most preferably to a fixed fraction of its original thickness. Prior to pressing, a gasket of Teflon-coated glass fiber is placed on each side. The CCGDL's are smaller in surface area than the PEM, and each fits in the window of the respective gasket. The height of the gasket is 70% of the height of the CCGDL, to allow 30% compression of the CCGDL when the entire assembly is pressed. Preferably the degree of compression is between 0% and 60%, more preferably 10%–50%, more preferably 20%–40%, and most preferably about 30% as indicated. The pressing temperature is preferably 120° C. or greater or more preferably 130° C. or greater, such that the ink is annealed to the previously annealed PEM during pressing.

Alternately, the catalyst ink may be applied to both sides of the PEM and the catalyst-coated PEM sandwiched between two GDL's.

Objects and advantages of this invention are further illustrated by the following examples, but the particular materials and amounts thereof recited in these examples, as well as other conditions and details, should not be construed to unduly limit this invention.

EXAMPLE

Catalyst Dispersion

Carbon-supported catalyst particles (NE ChemCat), Osaka, Japan; specified as 50–60% carbon and 40–50% catalyst metal by weight, the catalyst metal being either Pt for cathode use or Pt and Ru in a weight ratio of 2:1 for anode use) are dispersed in an aqueous dispersion of Nafion™ 1000 (SE10172, 10% Nafion 1000 in primarily water, DuPont Chemicals, Wilmington Del.) and the mixture is heated to 100° C. for 30 minutes with stirring using a standard magnetic stirring bar. The mixture is then cooled and diluted with water to a coatable consistency, followed by high shear stirring for 5 minutes with a Handishear™ hand-held stirrer (Virtis Co., Gardiner, N.Y.) at 30,000 rpm.

Catalyst-Coated Gas Diffusion Layer

A sample of 0.2 mm thick Toray Carbon Paper (Cat. No. TGP-H-060, Toray Industries, Inc., Tokyo, Japan) is hand-dipped in an approximately 1–20% solids, preferably 1–6% solids, most preferably 5% solids aqueous TEFLON™ dispersion (prepared by diluting a 60% solids aqueous dispersion, Cat. No. T-30, DuPont), then dried in an air oven at 50–60° C. to drive off water and form a gas diffusion layer (GDL).

The GDL is coated with a carbon black dispersion as follows: A dispersion of VULCAN™ X72 carbon black (Cabot Corp., Waltham, Mass.) in water is prepared under high-shear stirring using a Roth mixer equipped with a 7.6 cm blade at 4500 rpm. In a separate container, an aqueous dispersion of TEFLON™ (T-30, DuPont) is diluted with DI water to 5% solids, to which the carbon black dispersion is added, with stirring. The resulting mixture is filtered under vacuum to obtain a retentate that is approximately 20% solids mixture of water, TEFLON™ and carbon black. The pasty mixture is treated with approximately 3.5% by weight of a surfactant (TRITON X-100, Union Carbide Corp., Danbury, Conn.), followed by the addition of isopropyl alcohol (IPA, Aldrich Chemical Co., Milwaukee, Wis.) such that the w/w proportion of IPA to paste is 1.2:1. The diluted mixture is again stirred at high shear using a three-bladed VersaMixer (anchor blade at 80 rpm, dispersator at 7000 rpm, and rotor-stator emulsifier at 5000 rpm) for 50 minutes at 10° C.

The dispersion thus obtained is coated onto the dried Toray paper at a wet thickness of approximately 0.050 mm using a notch bar coater. Overnight drying at 23° C. to remove IPA is followed by drying in an oven at 380° C. for 10 minutes, to produce a coated GDL of approximately 0.025 mm thickness and a basis weight (carbon black plus TEFLON™) of approximately 25 g/m$^2$.

The HGDL thus coated with carbon black is then hand-coated (brushed) with the catalyst dispersion prepared above in an amount yielding 0.5 mg of catalyst metal (Pt or Pt plus Ru) per square centimeter and dried to form a catalyst-coated gas diffusion layer (CCGDL).

Polymer Electrolyte Membrane

A polymer electrolyte membrane (PEM) was prepared by notch-coating an aqueous dispersion of Nafion™ 1000 (DuPont Chemical Co.) onto a backing of poly(vinyl chloride)-primed poly(ethylene terephthalate) (3M Co., St. Paul, Minn.) at a loading such that the final, dried film is approximately 25 $\mu$m thick. The cast film is first passed through a drying oven at 50–60° C. (approximately 3–4 minutes dwell time), then dried at 130° C. for 4 minutes in an air-impingement oven to remove the remainder of the solvent and to anneal the Nafion™ film. The dried film is peeled from the backing for subsequent use.

Five-Layer Membrane Electrode Assembly

The PEM is then sandwiched between two CCGDL's, with the catalyst coating facing the PEM. A gasket of Teflon-coated glass fiber is also placed on each side. The CCGDL's are smaller in surface area than the PEM, and each fits in the window of the respective gasket. The height of the gasket is 70% of the height of the CCGDL, to allow 30% compression of the CCGDL when the entire assembly is pressed. The assembly is pressed in a Carver Press (Fred Carver Co., Wabash, Ind.) for 10 minutes at a pressure of 30 kg/cm$^2$ and a temperature of 130° C. to form the finished membrane electrode assembly (MEA).

MEA Testing

The MEA made above demonstrated excellent performance in a hydrogen test cell.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A membrane electrode assembly comprising an annealed polymer electrolyte membrane, additionally comprising at least one annealed catalyst layer in contact with said annealed polymer electrolyte membrane, wherein said catalyst layer comprises polymer electrolyte and catalyst.

2. The membrane electrode assembly according to claim 1 wherein said annealed catalyst layer comprises a polymer electrolyte annealed to an annealing temperature of 120° C. or more.

3. The membrane electrode assembly according to claim 1 wherein said annealed catalyst layer comprises a polymer electrolyte annealed to an annealing temperature of 130° C. or more.

4. A method of making a membrane electrode assembly comprising the steps of:

a) casting a dispersion of a first polymer electrolyte to form a membrane; and
b) annealing said membrane by heating to a first annealing temperature of 120° C. or greater;
c) subsequently applying at least one catalyst layer comprising a second polymer electrolyte and a catalyst to said polymer electrolyte membrane; and
d) annealing said catalyst layer in contact with said polymer electrolyte membrane by heating to a second annealing temperature of 120° C. or greater.

5. The method according to claim 4 wherein said first annealing temperature is 130° C. or greater.

6. The method according to claim 4 wherein said second annealing temperature is 130° C. or greater.

7. The method according to claim 4 wherein said first polymer electrolyte has an equivalent weight of 1200 or less.

8. The method according to claim 4 wherein said first polymer electrolyte has an equivalent weight of 1050 or less.

9. The method according to claim 4 wherein said second polymer electrolyte has an equivalent weight of 1200 or less.

10. The method according to claim 4 wherein said second polymer electrolyte has an equivalent weight of 1050 or less.

11. The method according to claim 4 wherein said catalyst layer is coated on a electrically conductive, gas permeable gas diffusion layer prior to being applied to said polymer electrolyte membrane.

12. The method according to claim 4 wherein said step of annealing said catalyst layer in contact with said polymer electrolyte membrane is accomplished at a pressure of 10–35 $kg/cm^2$ or greater.

13. The method according to claim 4 wherein said first and second polymer electrolytes are fluoropolymers bearing sulfonate functional groups.

14. The method according to claim 4 wherein said first and second polymer electrolytes are Nafion®.

15. The membrane electrode assembly according to claim 1 which comprises a first gas diffusion layer, a first catalyst layer, an annealed polymer electrolyte membrane, a second catalyst layer, and a second gas diffusion layer, in that order.

* * * * *